(12) United States Patent
Halbur et al.

(10) Patent No.: US 7,766,222 B2
(45) Date of Patent: Aug. 3, 2010

(54) INFLATABLE FINANCIAL TRANSACTION PRODUCT

(75) Inventors: Ted C. Halbur, Lino Lakes, MN (US); Erin M. Borkowski, Andover, MN (US); Chad Albers, Minneapolis, MN (US); Adam W. Reynolds, Minneapolis, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 942 days.

(21) Appl. No.: 11/592,713

(22) Filed: Nov. 3, 2006

(65) Prior Publication Data

US 2008/0109303 A1 May 8, 2008

(51) Int. Cl.
*G06Q 40/00* (2006.01)
*G07D 11/00* (2006.01)
*G07F 19/00* (2006.01)

(52) U.S. Cl. .................................. 235/379; 235/487
(58) Field of Classification Search ....................... None
See application file for complete search history.

(56) References Cited

U.S. PATENT DOCUMENTS

| 3,589,047 | A |  | 6/1971 | Hess et al. |
| 4,378,391 | A |  | 3/1983 | Allen |
| D283,337 | S |  | 4/1986 | Wolfe |
| D304,217 | S |  | 10/1989 | Klitsner |
| 5,009,624 | A |  | 4/1991 | Estam-Goggin |
| 5,074,765 | A |  | 12/1991 | Pekar |
| 5,144,708 | A | * | 9/1992 | Pekar ..................... 137/223 |
| 5,372,487 | A |  | 12/1994 | Pekar |
| 5,406,661 | A |  | 4/1995 | Pekar |
| 5,564,143 | A |  | 10/1996 | Pekar et al. |
| 5,638,565 | A |  | 6/1997 | Pekar |
| 5,797,783 | A |  | 8/1998 | Harris |
| 5,819,448 | A |  | 10/1998 | Kieves et al. |
| 5,852,889 | A |  | 12/1998 | Rinaldi |
| 5,890,744 | A |  | 4/1999 | Chan |
| 6,348,248 | B1 |  | 2/2002 | Randolph |
| 6,805,606 | B1 |  | 10/2004 | Kellum |
| 6,978,561 | B1 |  | 12/2005 | Hunter |
| 2002/0117243 | A1 | * | 8/2002 | Koren ..................... 150/147 |
| 2002/0143697 | A1 |  | 10/2002 | Gotfried |
| 2005/0242193 | A1 | * | 11/2005 | Smith et al. ............. 235/487 |
| 2006/0157554 | A1 |  | 7/2006 | Halbur et al. |

* cited by examiner

*Primary Examiner*—Michael G Lee
*Assistant Examiner*—Matthew Mikels
(74) *Attorney, Agent, or Firm*—Griffiths & Seaton PLLC (57) ABSTRACT

A financial transaction product includes a housing and an account identifier. The housing includes a bladder configured to be selectively inflated and deflated. The account identifier is on the housing and links the housing to at least one of a financial account or a financial record such that the housing can be used toward the purchase of one or more of goods and services. Methods of assembling a financial transaction product, methods of encouraging purchase and facilitating use of a financial transaction product, and other embodiments are also disclosed.

7 Claims, 12 Drawing Sheets

INFLATABLE FINANCIAL TRANSACTION PRODUCT

BACKGROUND OF THE INVENTION

Stored-value products and other financial transactions cards come in many forms. A gift card, for example, is a type of stored-value product that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value products, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a financial transaction product including a housing and an account identifier. The housing includes a bladder configured to be selectively inflated and deflated. The account identifier is on the housing and links the housing to at least one of a financial account or a financial record such that the housing can be used toward the purchase of one or more of goods and services. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A stored-value product or other financial transaction product is adapted for making purchases of goods and/or services from e.g. a retail store or website. According to one embodiment, an original consumer buys a stored-value product to give a recipient who in turn is able to use a stored-value product at a retail store or a setting to pay for goods and/or services. A stored-value product, according to embodiments of the present invention, not only provides the consumer with access to a financial transaction account or record, but also provides the consumer with an amusing article or toy. In one embodiment, the stored-value product is configured to at least partially inflate and deflate as desired by a bearer of the stored-value product. The inflatable nature of the stored-value product generally promotes the sale and/or loading of the stored-value product by potential consumers and/or bearers of the stored-value product.

Figure 1A:
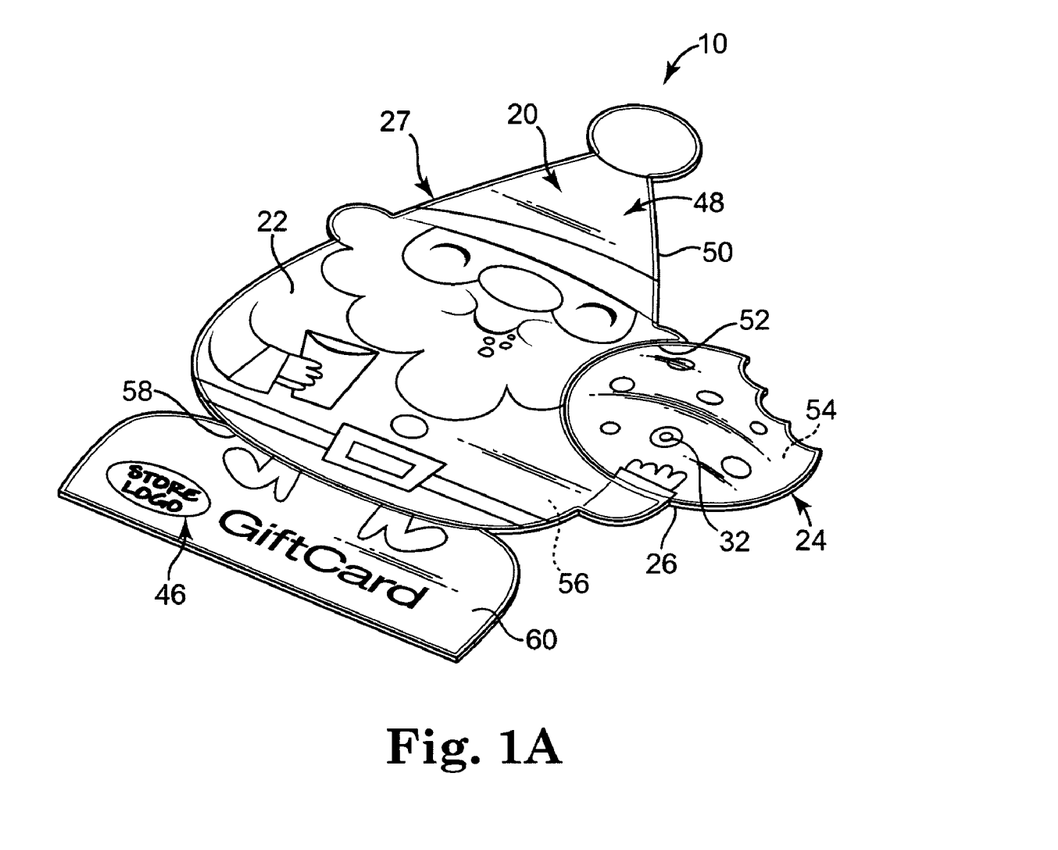
FIG. 1A is a top perspective view of a stored-value product in a deflated state, according to one embodiment of the present invention.
Figure 1B:
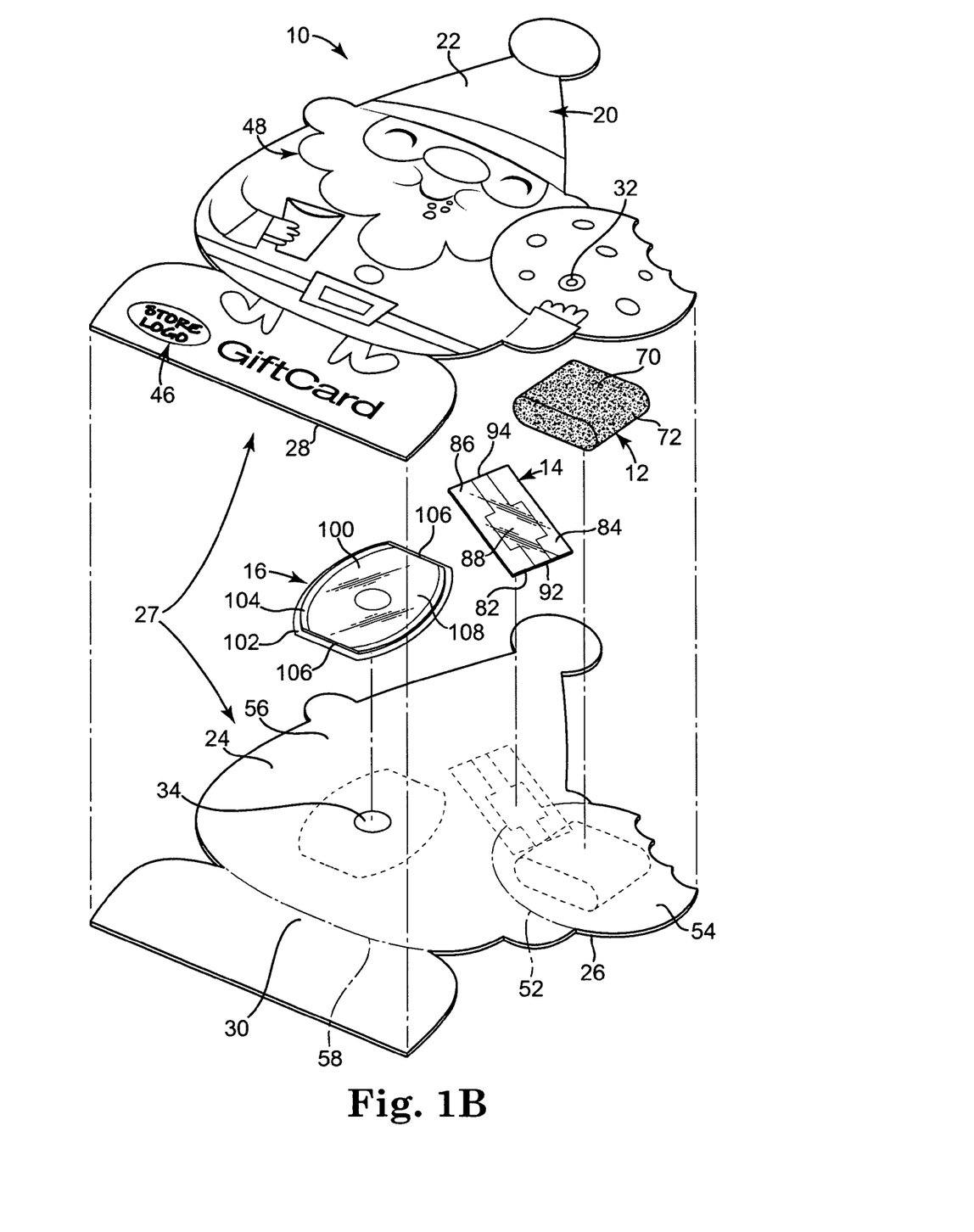
FIG. 1B is an exploded, top perspective view of the stored-value product of FIG. 1A.
Figure 2:
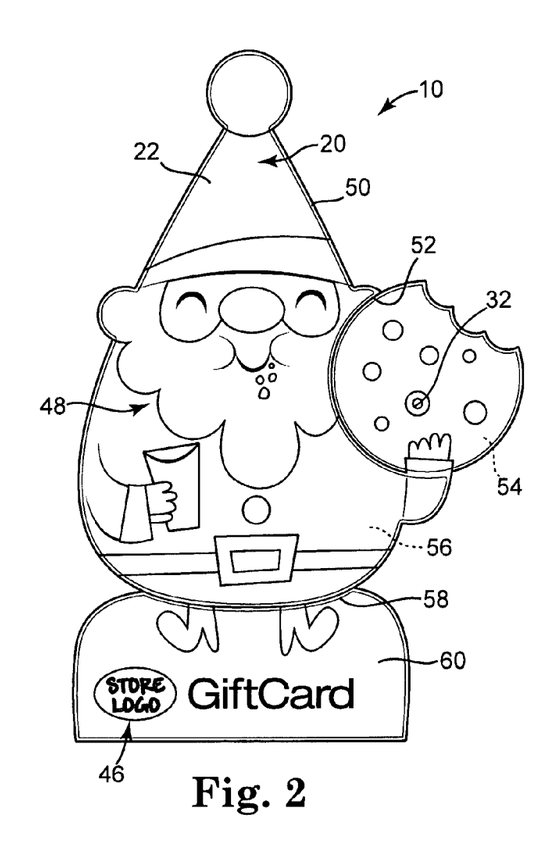
FIG. 2 is a front view of the stored-value product of FIG. 1A in a deflated state.

Turning to the figures, FIGS. 1A and 1B respectively illustrate non-exploded and exploded, top perspective views of a financial transaction product, more particularly, a stored-value product 10 according to an embodiment of the present invention. Stored-value product 10 is configured to be used as tender toward the purchase of goods and/or services and is configured to be selectively inflated and deflated for the amusement of a bearer of stored-value product 10. In one example, stored-value product 10 includes a interior pump 12 such that stored-value product 10 is readily inflatable by the product bearer without requiring auxiliary tools. Stored-value product 10 includes a check valve 14 permitting fluid flow from pump 12 into a bladder (such as bladder 56 as shown, for example, in FIGS. 1A, 1B, and 10) to inflate stored-value product 10 while generally not permitting flow from the bladder back to pump 12. In one instance, stored-value product 10 includes a release or exhaust valve 16 configured to selectively release air from within stored-value product 10. In this manner, the product bearer can manipulate stored-value product 10 to selectively inflate and deflate stored-value product 10 as desired. As such, bladder 56 is one example of means for maintaining various volumes of air.

Referring to FIGS. 1A-7, in one embodiment, stored-value product 10 includes a first substantially planar member or layer 20 defining a first or front surface 22 and a second substantially planar member or layer 24 defining a second or rear surface 26. In one example, first member 20 is opposite second member 24. In one example, first and second members 20 and 24 are generally sized and shaped similar to one another. In one embodiment, member 20 is shaped as a square, circle, oval, star, or any other suitable shape, for example, as a perimeter of a character such as Santa Clause, etc. In one example, member 20 is generally rectangular in shape and/or is sized similar to that of an identification card, a credit card, or other card sized to fit in a wallet of a card bearer when deflated. Members 20 and 24 are configured to be coupled to each other to at least partially serve as an exterior shell or housing 27 of stored-value product 10.

In one embodiment, first and second members 20 and 24 are separately formed and are each formed of a plastic or other suitable material configured to deform or otherwise transition during inflation of stored-value product 10 and to at least partially return to their original shape and dimensions when stored-value product 10 is deflated. As such, in one embodiment, members 20 and 24 are at least partially elastomeric. In one example, first and second members 20 and 24 are formed of a thin, heat sealable, thermoplastic sheet material, such as polyurethane or polyvinyl chloride, or any other suitable material. Members 20 and 24 define an interior surface 28 and 30, respectively, opposite corresponding outer front and rear surfaces 22 and 26, respectively. In this manner, members 20 and 24 are positioned relative to each other such that interior surfaces 28 and 30 are generally facing and adjacent to each other, as will be further described below.

In one example, housing 27, includes an intake aperture 32 and an exhaust aperture 34. Intake aperture 32 is positioned to correspond with interior pump 12 and is configured to provide for the passage of air from the atmosphere surrounding stored-value product 10 into stored-value product 10 during inflation. In particular, air passes from the surrounding atmosphere through intake aperture 32 and to interior pump 12, as will be further described below. In one example, intake aperture 32 is generally small having a diameter of approximately 0.1 inch or less.

Exhaust aperture 34 is positioned to correspond with a main bladder or chamber 56 of stored-value product 10. Exhaust aperture 34 provides a passage for air from within stored-value product 10 out to the atmosphere surrounding stored-value product 10 during deflation of stored-value product 10. In one embodiment, exhaust aperture 34 is aligned with release valve 16 and is generally larger in size than intake aperture 32. In one embodiment, exhaust aperture 32 has a diameter of approximately 0.3 inch or larger. In one embodiment, one of intake aperture 30 and exhaust aperture 32 is included on each of members 20 and 24. For example, intake aperture 30 is included on first member 20, and exhaust aperture 32 is included on second member 24. In one embodiment, intake and exhaust apertures 30 and 32 are both defined by a single member, namely, one of first member 20 and second member 24.

Figure 3:
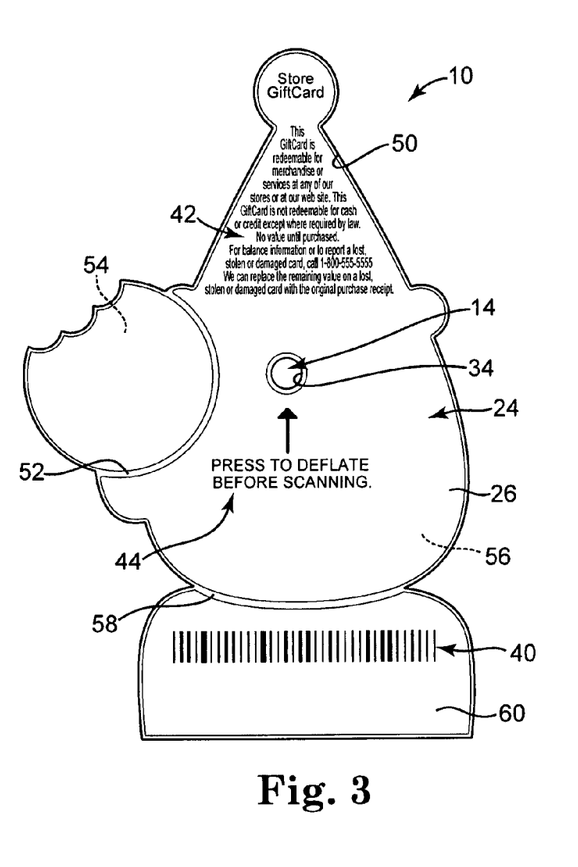
FIG. 3 is a rear view of the stored-value product of FIG. 1A in a deflated state.
Figure 4:
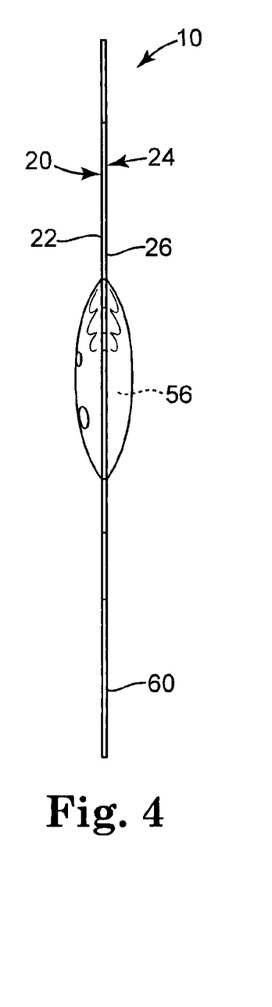
FIG. 4 is a right side view of the stored-value product of FIG. 1A in a deflated state.
Figure 5:
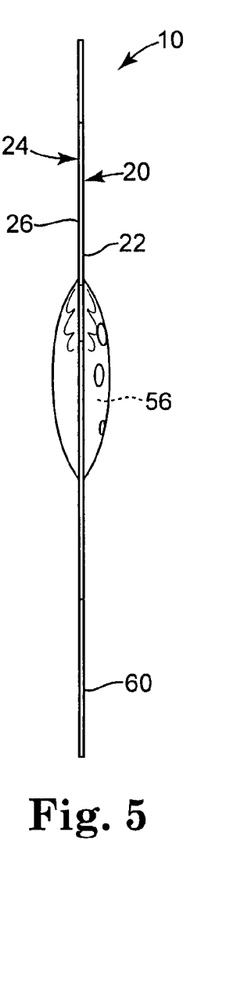
FIG. 5 is a left side view of the stored-value product of FIG. 1A in a deflated state.
Figure 6:
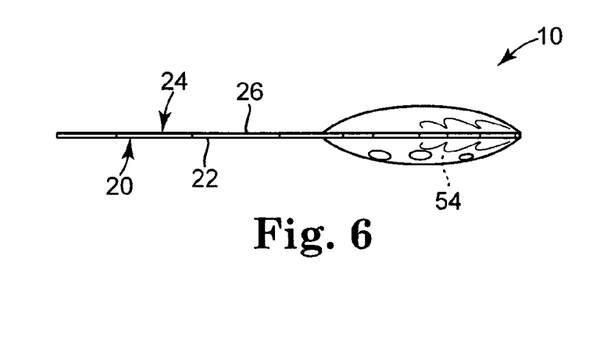
FIG. 6 is a top view of the stored-value product of FIG. 1A in a deflated state.
Figure 7:
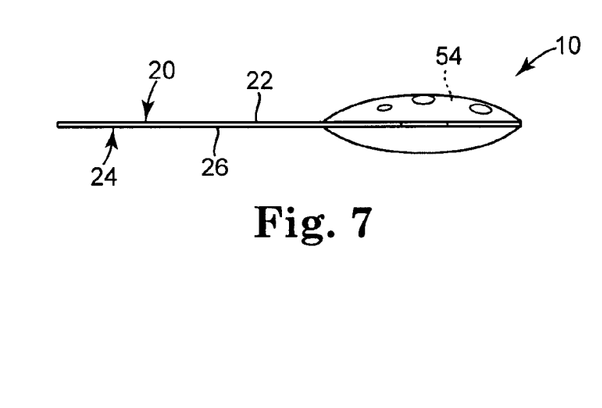
FIG. 7 is a bottom view of the stored-value product of FIG. 1A in a deflated state.

Referring to FIG. 3, stored-value product 10 includes an account identifier 40, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 40 is printed on second surface 26 of stored-value product 10. Account identifier 40 indicates a financial account or record to which stored-value product 10 is linked. The financial account or record of the monetary balance on stored-value product 10 optionally is maintained on a database, other electronic or manual record-keeping system, or, in the case of "smart" cards for example, on a chip or other electronic device on or in stored-value product 10 itself. Accordingly, by reading account identifier 40, a financial account or record linked to stored-value product 10 is identified and can subsequently be activated, have amounts debited therefrom, and/or have amounts added thereto. Account identifier 40 is one example of means for associating stored-value product 10 with a financial account or a financial record.

In one embodiment, members 20 and 24 of stored-value product 10 include any suitable combination of indicia. In one example, members 20 and 24, move particularly, surfaces 22 and 26, include one or more of redemption indicia 42, instructional indicia 44, brand indicia 46, and decorative indicia 48. Indicia 42, 44, 46, and 48 may be included on either one or both of front surface 22 and rear surface 26. In one embodiment, redemption indicia 42 are included on stored-value product 10, for example, on second surface 26. Redemption indicia 42 indicate that stored-value product assembly 10 is redeemable for the purchase of goods and/or services and that, upon use, a value of the purchased goods and/or services will be deducted from the financial account or record linked to stored-value product 10. In one embodiment, redemption indicia 34 include phrases such as "<NAME OF STORE> GiftCard" and "This GiftCard is redeemable for merchandise or services at any of our stores or at our website," and/or provides help or telephone line information in the case of a lost, stolen, or damaged stored-value product, etc.

Instructional indicia 44, according to one embodiment, include text or graphics, which at least partially instruct a bearer of stored-value product 10 on the operation or use of stored-value product 10. For example, second surface 26 may include instructional indicia 44 including "Press to deflate before scanning" with an arrow pointing to exhaust valve 16. In such an example, instructional indicia 44 instruct a bearer of stored-value product 10 how to deflate stored-value product 10 and instruct a employee of the associated retail store or other personnel or device to deflate stored-value product 10 prior to processing stored-value product 10 for sale or for loading.

Once again referring to FIGS. 1A-7, in one embodiment, brand indicia 46 identify a brand, e.g. a product brand, a store brand, etc., associated with stored-value product assembly 10. Indicia 46 disposed on stored-value product 10 are one example of means for associating stored-value product assembly 10 with at least one of a product, a brand, a store, a holiday, a season, an occasion, a media format, e.g. characters, logos, scenes, or other illustrations or photographs related to at least one of a movie, television show, book, video game, etc.

Decorative indicia 48 are included on stored-value product 10 to provide stored-value product 10 with an aesthetically pleasing appearance to a bearer of stored-value product 10. In one embodiment, decorative indicia 48 include one or more of graphics, text, patterns, colors, or other suitable objects. In one example, decorative indicia 48 include holiday related indicia, etc. such as a Santa Clause or other graphic(s) readily associated with a holiday or other occasion. In one embodiment, brand indicia 46 and decorative indicia 48 may be intermixed such as where a character or other icon associated with a brand is included in a decorative scene as part of decorative indicia 48. In one example, decorative indicia 48 are only included on one of front and rear surfaces 22 and 26 such as front surface 22. However, in one embodiment, decorative indicia 48 are included on both surfaces 22 and 26.

In one embodiment, aligned housing members 20 and 24 are configured to be heat sealed, ultrasonically welded, adhered, sealed with radio frequency (RF) energy, or otherwise coupled and sealed together in a generally air-tight manner. In one example, housing members 20 and 24 are sealed to form a perimeter seal 50 and an intermediary seal 52 configured to provide at least a pump chamber 54 and a second chamber or bladder 56. Perimeter seal 50 generally extends about the entire periphery of the members 20 and 24 so as to define outer edges of stored-value product 10, and, in one example, intermediary seal 52 extends from one point of perimeter seal 50 to another point of intermediary seal 52 to section stored-value product 10 into pump chamber 54 and bladder 56.

More specifically, pump chamber 54 is sized and configured to be in communication with intake aperture 32 and to house interior pump 12. Bladder 56 is adjacent and in generally communication with exhaust aperture 34 and is configured to house release valve 16. In one embodiment, stored-value product 10 includes a second intermediary seal 58 configured to further section housing 27 into chambers or bladders, or in one embodiment, as illustrated in FIGS. 1A-7 and 10, to section off and define a non-inflatable portion 60 of stored-value product 10. In one embodiment, account identifier 40 is defined on non-inflatable portion 60 to facilitate reading of account identifier 40 that may otherwise be obscured when stored-value product 10 is fully or partially inflated.

As briefly described above, interior pump 12 is maintained within housing 27, more particularly, pump chamber 54, and is configured to inflate bladder 56 of stored-value product 10 on command of a bearer of stored-value product 10. More specifically, interior pump 12 is sealed within pump chamber 54 except for intake aperture 32 and check valve 14. Interior pump 12 is any suitable pump. In one example, pump 12 is formed of substantially soft or compressible material such that pump 12 does not generally provide stored-value product 10 with any undesirable ridge, bumps, corners, etc. For instance, pump 12 is formed of an open-cell, reticulated, and resiliently flexible elastomeric material 70 configured to be repeatedly compressed while still returning to near the original size and shape require for use in stored-value product 10.

More specifically, in one example, interior pump 12 includes a polyurethane foam material 70. For instance, in one embodiment, material 70 is a polyurethane foam material 70 having ten to fifty pores or voids 72 per inch. Material 70 is provided of sufficient volume to provide for easy and fairly efficient inflation of stored-value product 10. In one example, material 70 is formed as a one inch cube having 0.5 inch to 1 inch thickness and a cylinder of approximately 1 inch diameter and with a thickness of 0.5 inch to 1 inch. However, in other embodiments, material 70 is any suitable shape and size. In one instance, material 70 has a thickness of between about 0.5 inch and 0.75 inch and has a volume of between about 0.75 and about 1.25 cubic inches. Other suitable materials and or sizing of interior pump 12 are also contemplated. Pump 12 and other suitable pumps are examples of means for forcing pressurized air into bladder 56.

Figure 9:
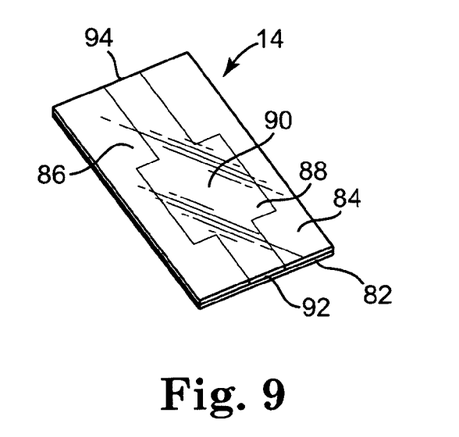
FIG. 9 is a perspective view of a check valve of a stored-value product, according to one embodiment of the present invention.

Referring to FIGS. 1B and 9, check valve 14 is positioned to extend from pump chamber 54, through intermediary seal 52 and into bladder 56. Check valve 14 provides for one way fluid flow to bladder 56 from the pump chamber 54 including interior pump 12. In one example, check valve 14 includes two superposed layers 82 and 84 of heat or otherwise sealable plastic film sealed together along laterally-spaced zones 86 along the side edges thereof to define a central channel 88 therebetween. In one embodiment, layers 82 and 84 are a thermoplastic sheet material such as polyurethane or polyvinyl chloride and, in one instance, are formed of the same material as first member 20 and second member 24. However, in one embodiment, layers 82 and 84 have a substantially less gauge or thickness than members 20 and 24, for example, a thickness of between 0.001 to 0.015 inch. Channel 88 serves for one-way fluid flow from pump chamber 54 and interior pump 12 into bladder 56.

Channel 88 is configured to remain "open" from pump chamber 54 to bladder 56 through an area of intermediary seal 52 while outer portions such as sealed zones 86 are sealed along intermediary seal 52. In one example, channel 88 is maintained open by use of a barrier material such as a coating 90 disposed between the interior surfaces 28 and 30 at a position to correspond with channel 88 (FIG. 9). Barrier material 90 is applied to opposed areas on both interior surfaces 28 and 30 of sufficient area and thickness to prevent heat or other sealing together of the so-coated area of members 20 and 24 when forming intermediary seal 52. Barrier material 90 may be applied by conventional printing techniques such as silk screening, rotogravure, or a flexographic process. In one embodiment, barrier material 90 is applied as a composition in liquid dispersion medium of an organic solvent or water base with a dispersed phase of finely divided microscopic particles, on the order of five (5) microns in diameter of polyethylene, polytetrafluoroethylene (Teflon) or silicone.

In one embodiment, check valve 14 is configured to be biased "open" at first end 92 within pump chamber 54 by interaction with housing members 20 and/or 24 and/or by interaction with adjacent areas of pump material 70. In contrast, layers 82 and 84 near second end 94 opposite first end 92, which are disposed within bladder 56, have an inherent tendency to remain in intimate surface-to-surface contact due to the construction and texture of layers 82 and 84. For example, layers 82 and 84 may be formed with a high gloss, cohesive surface on one side or end and a dull or matte surface on the other, opposite side or end. These surface characteristics of layers 82 and 84 contribute to one-way flow through check valve 14. For example, the inner surfaces of layer 82 and 84 contacting one another near second end 94 are dull or matte finished such that the surfaces exhibit substantial cohesion or surface-to-surface affinity, which thereby provides providing the layers 82 and 84 with a tendency to stick together at least near second end 94. Due to this tendency, check valve 14 will generally remain closed unless pressurized fluid such as air is flowing through channel 88 from pump chamber 54, more particularly, internal pump 12 is introduced to check valve 14.

Figure 8A:
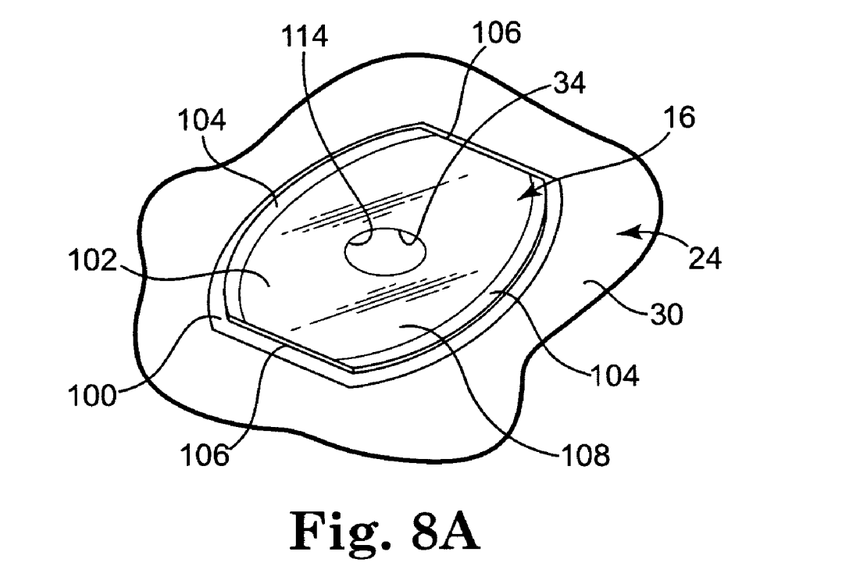
FIG. 8A is a perspective view of a release valve in a closed position and an interior portion of a rear member of a stored-value product, according to one embodiment of the present invention.
Figure 8B:
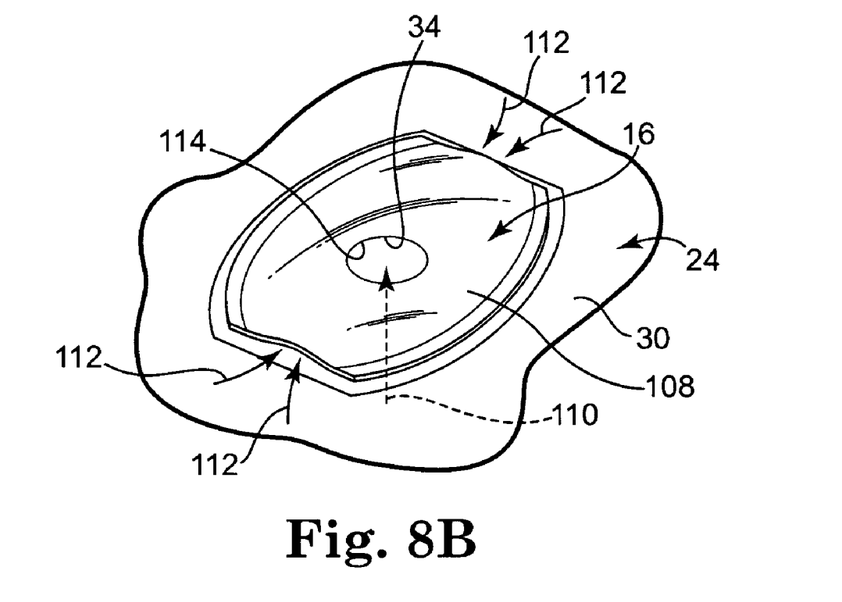
FIG. 8B is a perspective view of the release valve of FIG. 8A in an open position and the interior portion of the rear member of the stored-value product of FIG. 8A.

Referring to FIGS. 8A and 8B, release valve 16 includes superimposed layers 100 and 102, which, for example, are each formed of a unitary pliable thermoplastic film and which are sealed together at circumferentially spaced locations as generally indicated at 104. The spacing of sealing 104 generally defines at least one open end 106. In one example, release valve 16 is provided with two open ends 106 opposite one another. Further, layers 100 and 102 are sealed so as to define a non-sealed central zone or chamber 108. In one embodiment, a release material or coating (not shown) similar to that described above with respect to check valve 14, namely coating 90, may be used to prevent or decrease sealing of layer 100 to layer 102 at central zone 108.

In one example, layers 100 and 102 are formed of similar materials as members 20 and 24 and/or check valve 14 of a thickness suitable to provide layers 100 and 102 with sufficient pliability, flexibility, and pressure responsiveness while still being sealable and durable to serve their intended function. In one embodiment, layer 100 is a rear layer and layer 102 is a front layer. In one example, rear layer 100 (or other layer 100 or 102 that will be positioned adjacent exhaust aperture 34 upon construction) is formed with lesser thickness than front layer 100 and defines an opening 114 similar in size to exhaust aperture 34. In this manner, rear layer 102 is generally more readily deformable and pliable than front layer 100.

Figure 10:
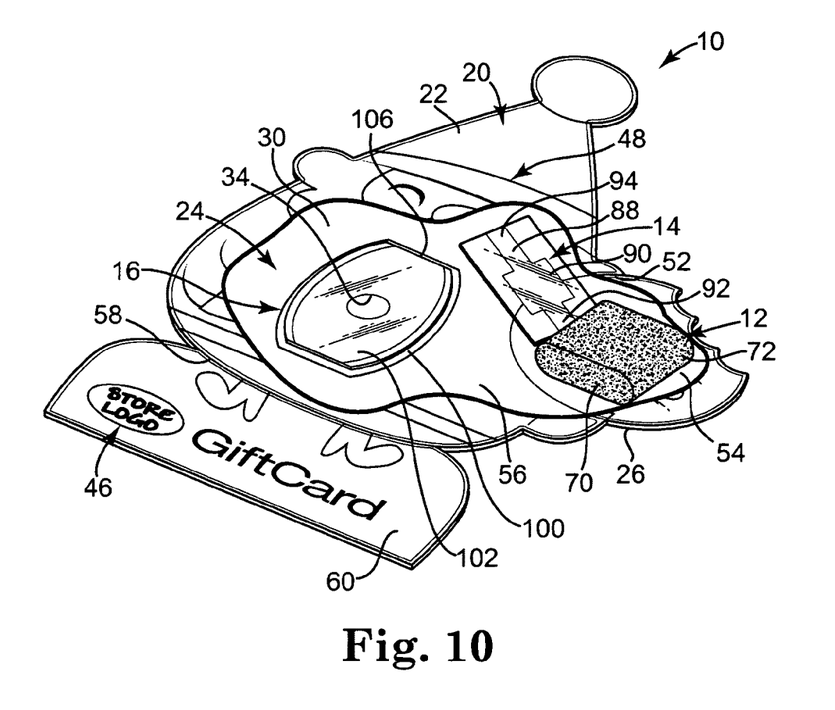
FIG. 10 is a top perspective view of the stored-value product of FIG. 1 with cutouts to illustrate the positioning of stored-value product components.

With the above construction in mind, rear layer 100 is configured to be positioned adjacent rear internal surface 30 of rear housing member 24 an adhered thereto around exhaust aperture 34 as illustrated with additional reference to FIG. 1B or 10. Upon coupling, opening 114 in layer 100 of release valve 16 is aligned with exhaust aperture 34. Release valve 16 is configured such that when an opening force or pressure is transversely applied to front layer 102 through exhaust aperture 34 and opening 114 in rear layer 100 near a center portion thereof such, which is generally indicated by the broken line arrow 110, release valve 16 opens at each end 106. More specifically, due to the varying pliability of layers 100 and 102, the two layers 100 and 102 deform differently resulting in the opening of release valve 16 at each end 106 as generally indicated by arrows 112 and providing air flow out from the space between layers 100 and 102 via opening 114. Opening of each end 106 allows fluid such as air to flow from bladder 56 through release valve 16 and out of housing 27 via opening 114 to deflate stored-value product 10. In one embodiment, when force 110 is removed, layers 100 and 102 return to their original positions generally halting any further deflation of stored-value product 10. As such, release valve 16 is one example of means for releasing air from the means for maintaining.

Figure 11:
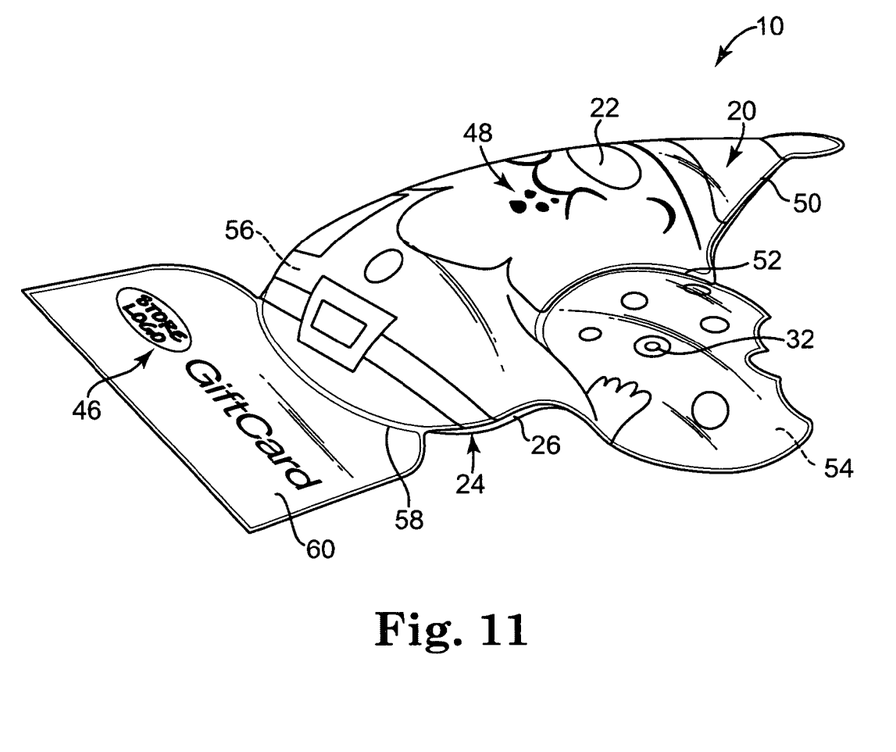
FIG. 11 is a top perspective view of the stored-value product of FIG. 1A in an inflated state, according to one embodiment of the present invention.

During assembly, which will be more fully described below, interior pump 12, check valve 14, and release valve 16 are all positioned relative to and/or coupled with one of members 20 or 24 in positions as generally indicated in FIGS. 1B and 10. The remaining member 20 or 24 is then placed over the other member 20 or 24, interior pump 12, check valve 14, and release valve 16 such that interior surfaces 30 and 32 face and/or abut one another. Subsequently, members 20 and 24 are sealed together along seal lines 50, 52, and/or 58 thereby coupling member 20 to member 24 and enclosing interior pump 12, check valve 14, and release valve 16 within housing 27. Once assembled, stored-value product 10 is ready for further packaging, etc. and/or presentation to consumers. Once assembled, stored-value product 10 is also configured to inflate and deflate, as will be further described below, as illustrated with reference to FIG. 1A in view of FIG. 11 (e.g., to transition between a collapsed state as illustrated in FIG. 1A and an expanded state as illustrated in FIG. 11).

Other embodiments of inflatable stored-value products are also contemplated. For example, rather than including a pump 12 and release valve 16, a stored-value product 10 may include a mouthpiece (not shown) configured to facilitate inflation of stored-value product 10 by the bearer (e.g., by blowing into the mouthpiece). The mouthpiece may be configured to be manipulated, for instance, squeezed, to permit the exhaust of air from stored-value product 10 through the mouthpiece. In one embodiment, stored-value product 10 includes one or more of a bladder 56, a pump chamber 54, and a non-inflatable portion 60. In one embodiment, no pump chamber 54 or non-inflatable portion 60 is included. Furthermore, check valve 14 and release valve 16 are only examples of one-way valves that may be used. Upon reading this disclosure, other one-way valves or other valves suitable for use in inflatable stored-value product 10 will be apparent to one of skill in the art. Other modifications are also contemplated.

Figure 12A:
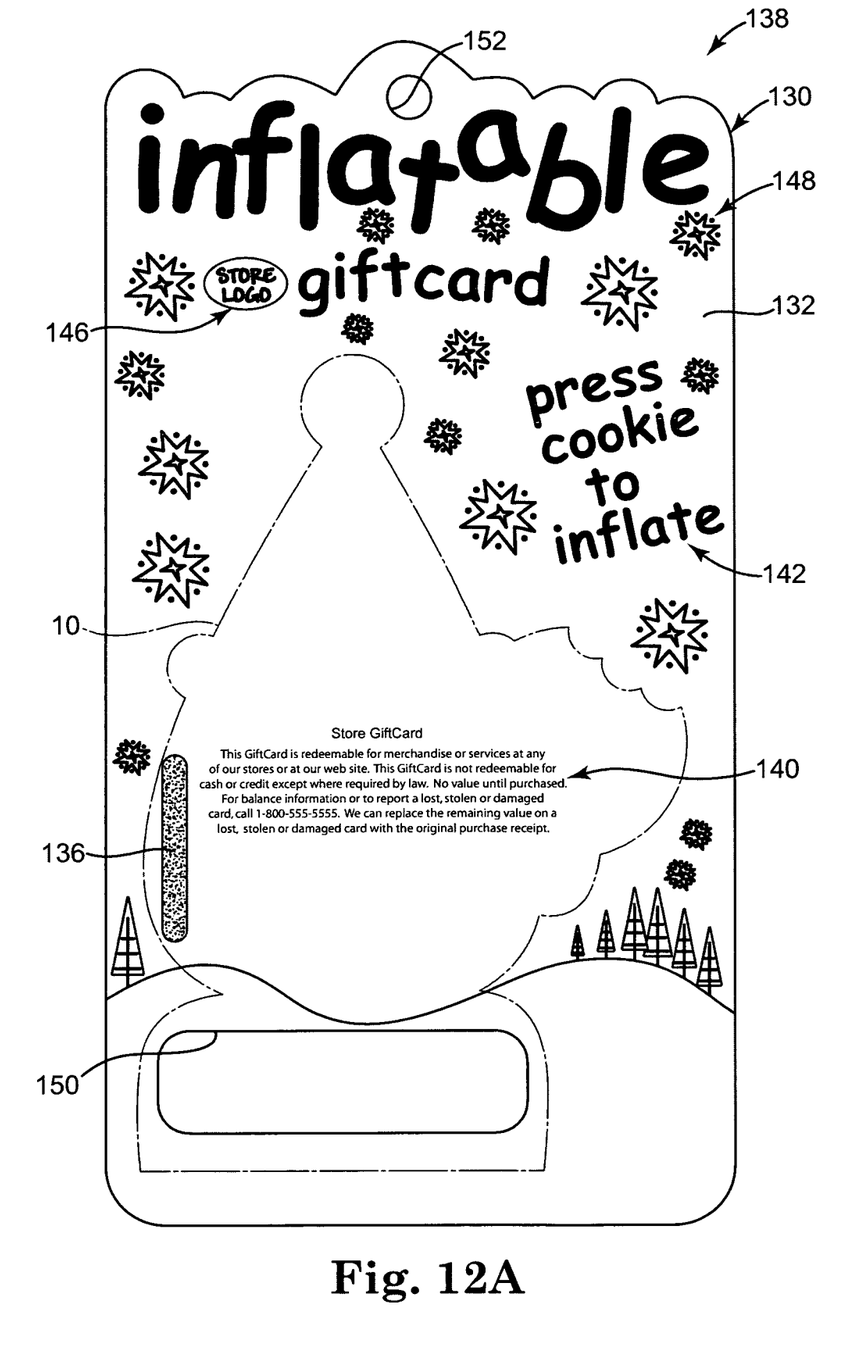
FIG. 12A is a front view of one embodiment of an unfolded backer for a supporting a stored-value product, according to one embodiment of the present invention.
Figure 12B:
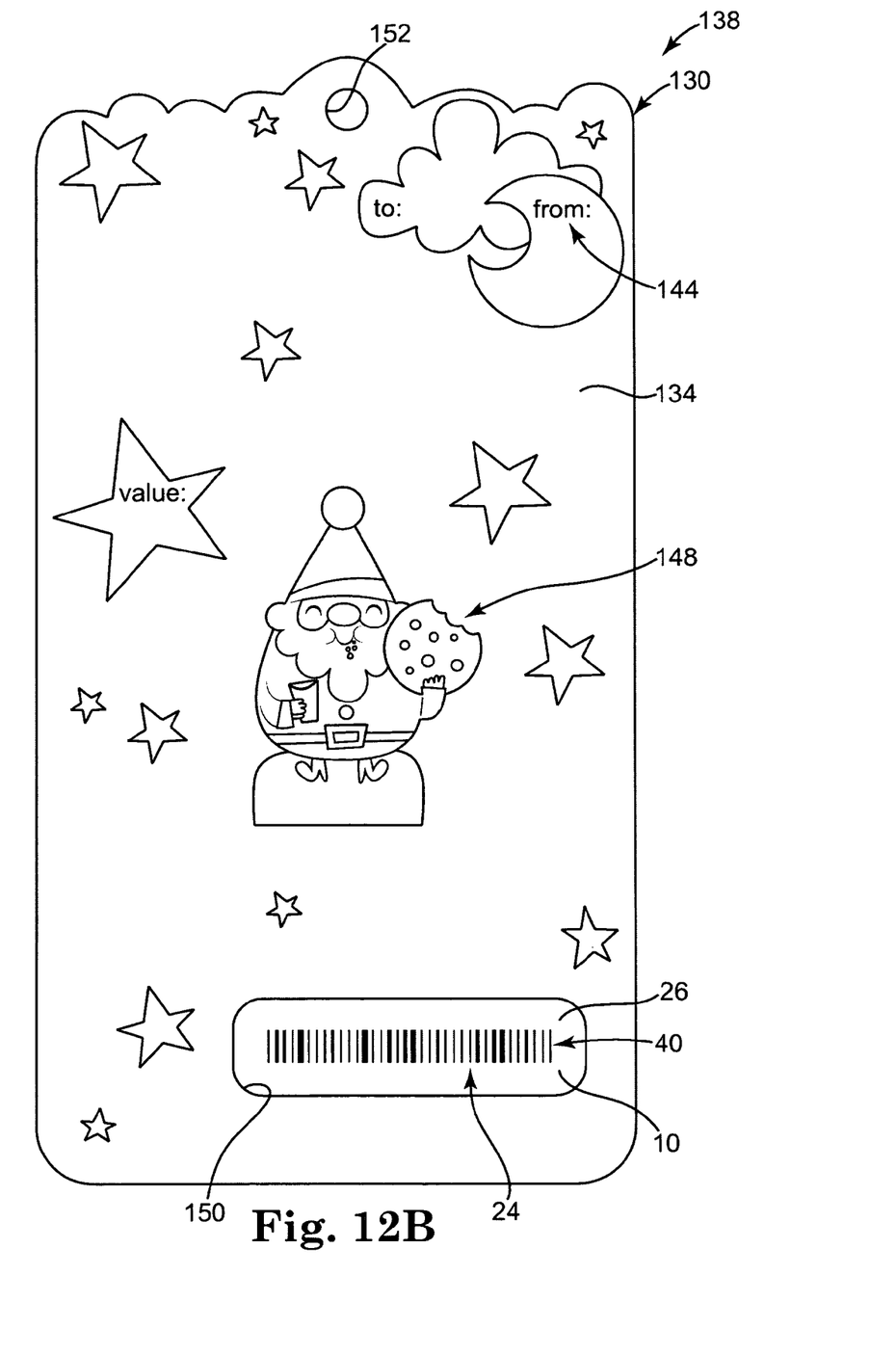
FIG. 12B is a rear view of the unfolded backer of FIG. 12A supporting a stored-value product, according to one embodiment of the present invention.

FIGS. 12A and 12B illustrate a carrier or backer 130 supporting stored-value product 10 (FIGS. 1A-7). Backer 130 comprises a single layer or multiple layers of paper or plastic material, for example, generally in the form of a relatively stiff but bendable/flexible card. Use of other materials is also contemplated. As such, backer 130 defines a first or front surface 132 (FIG. 12A) and a second or rear surface 134 (FIG. 12B). Stored-value product 10, which is generally represented in phantom lines in FIG. 12A for illustrative purposes (e.g., to allow for full viewing of front surface 132), is readily releasably attached to backer 130, for example, by an adhesive 136 or the like, such that stored-value product 10 with backer 130 define a stored-value product assembly 138.

Backer 130 displays indicia, graphics or text information including store logo(s), store name(s), slogans, advertising, instructions, directions, brand indicia, promotional information, holiday indicia, seasonal indicia, media format identifiers, characters, and/or other information. The various indicia may be included on one or more of front and rear surfaces 132 and 134. In one example, the indicia include one or more of redemption indicia 140, instructional indicia 142, message field indicia 144, brand indicia 146, decorative indicia 148, etc.

Redemption indicia 140 indicate that stored-value product 10 is redeemable for the purchase of goods and/or services and that upon use, a value of the purchased goods and/or services will be deducted from the financial account or record linked to stored-value product 10. In one embodiment, redemption indicia 140 include phrases such as "<NAME OF STORE> GiftCard" and "This GiftCard is redeemable for merchandise or services at any of our stores or at our website," and/or provides help or phone line information in case of a lost, stolen, or damaged stored-value product 10, etc.

Instructional indicia 142 include any indicia generally referring to how stored-value product 10 can be used for purposes other than value redemption. For example, indicia 142 may instruct the bearer that stored-value product 10 is inflatable and/or how to so inflate stored-value product 10. In one embodiment, instructional indicia 142 include one or more phrases such as "press cookie to inflate" where the cookie referred to corresponds with pump chamber 54 containing internal pump 12. Other instructional indicia 142 are also contemplated.

Message field indicia 144 for example include to, from, and gift card value fields configured to be written to by the bearer of stored-value product assembly 138 prior to presenting stored-value product assembly 138 to a recipient. As such, message field indicia 144 facilitates the consumer in preparing stored-value product assembly 138 for gifting to a recipient.

Brand indicia 146 identify a store, brand, department, etc. and/or services associated with stored-value product 10. Any decorative indicia 148, which may be similar to or coordinate with decorative indicia 48 of stored-value product 10 may also be included on backer 130. Any of indicia 140, 142, 144, 146, 148, or other indicia optionally may appear anywhere on backer 130 or stored-value product 10. Additional information besides that specifically described and illustrated herein may also be included.

In one embodiment, backer 130 includes a window or opening 150 for displaying account identifier 40 of stored-value product 10 as illustrated in FIG. 12B. As previously described, account identifier 40 is adapted for accessing a financial account or a financial record associated with stored-value product 10 for activating, loading, or debiting from the financial account or financial record. Accordingly, in one embodiment, window 150 allows access to account identifier 40 to activate and/or load stored-value product 10 without removing stored-value product assembly 10 from backer 130.

In one embodiment, backer 130 defines a hanging aperture 152 configured to receive a support arm or hook, such that stored-value card assembly 138 can be hung from a rail or rack within the retail setting or elsewhere to facilitate display of stored-value product assembly 138. According to one embodiment, FIG. 12A illustrates surfaces of backer 130 that will be supported on a rack or other fixture to be visible to a consumer of a retail store who is considering the purchase of stored-value product assembly 10. Other backers, such as foldable backers (not shown), can be used with various sizes and shapes of stored-value products 10.

Figure 13:
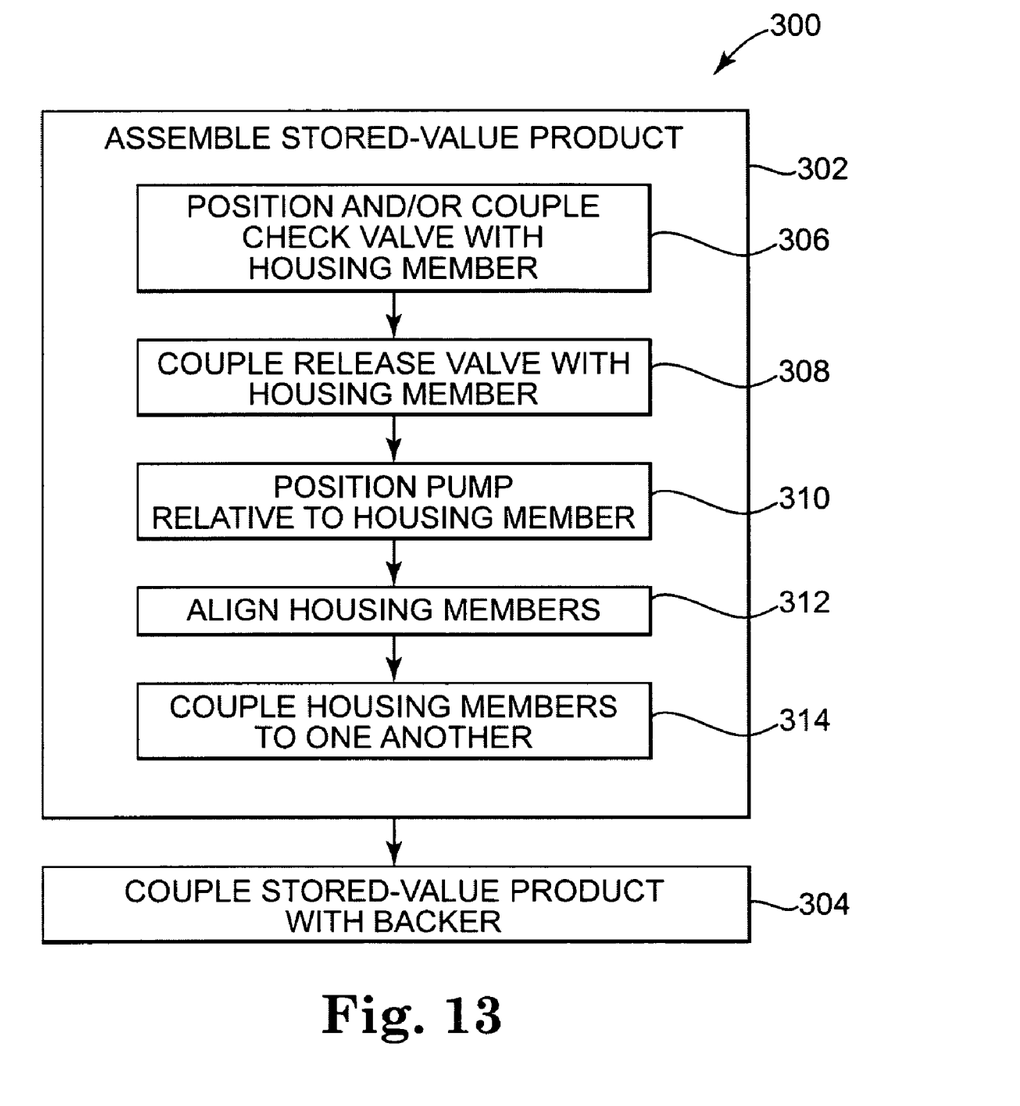
FIG. 13 is a flow chart illustrating a method of assembling a stored-value product, according to one embodiment of the present invention.

FIG. 13 is a flow chart illustrating one embodiment of a method 300 of assembling stored-value product assembly 138. Referring to FIG. 13 in view of FIGS. 1B and 10, at 302, stored-value product 10 is assembled and, at 304, stored-value product 10 is coupled with backer 130 (illustrated in FIGS. 12A and 2B). In particular, in one embodiment, assembling stored-value product 10 at 302 includes positioning and/or coupling check valve 14 to a housing member 20 or 24 at 306.

More specifically, check valve 14 is positioned to extend between areas that will eventually define part of pump chamber 54 and bladder 56 as generally indicated in FIG. 1B. In one example, check valve 14 is positioned such that first end 92 will be within pump chamber 54 and second end 94 will be within bladder 56. In this manner, check valve 14 extends across the future site of intermediary seal 52. In one embodiment, positioning check valve 14 includes tacking or otherwise at least partially coupling check valve 14 relative to housing member 20 or 24. In one embodiment, positioning check valve 14 at 306 includes applying a release material 90 as desired.

At 308, release valve 16 is positioned relative to second member 24 of housing 27 and coupled thereto. Release valve 16 is positioned to align with, and in one example, to be centered relative to, exhaust aperture 34 of second member 24. More specifically, rear release valve layer 102 abuts and is coupled to interior surface 30 of second member 24 about exhaust aperture 34.

At 310, pump 12 is positioned relative to a housing member 20 or 24 in a location that will eventually be within pump chamber 54 and that corresponds with a general position of intake aperture 32. In one embodiment, so positioning pump 12 includes placing pump 12 to interface with first end 92 of check valve 14 to facilitate maintaining first end 92 of check valve 14 in an open state.

Subsequently, at 312, first and second members 20 and 24 are aligned with one another. More specifically, in one embodiment, first interior surface 28 of first member 20 is positioned to face second interior surface 30 of second member 24, and an outer perimeter of first member 20 is aligned with an outer perimeter of second member 24. Once positioned properly, then at 314, first and second members 20 and 24 are coupled together, such as by heat or otherwise sealing members 20 and 24 together. In particular, perimeter seal 50 is formed around a periphery of members 20 and 24 and intermediary seal 52 is formed to define and at least partially separate pump chamber 54 and bladder 56. In one embodiment, forming seals 50 and 52 encloses interior pump 12 within pump chamber 54 except for intake aperture 32 and check valve 14. Intermediary seal 52, in one example, also serves to couple check valve 14 to housing 27 via seal zones 86 while maintaining a selectively open passageway through channel 88 of check valve 14 from pump chamber 54 to bladder 56.

In one embodiment, coupling members 20 and 24 together further includes forming non-inflatable portion 60 by completely sealing non-inflatable portion 60 off from pump chamber 54 and bladder 56 using, for example, second intermediary seal 58. Although described as having one bladder 56, in one embodiment, more than one bladder 56 is formed wherein each bladder 56 is in partial communication with each other such as through a passageway, valve, etc. The number of bladders 56 is generally chosen based on the desired aesthetic appeal of stored-value product 10. Other variations in assembling stored-value card 10 will be apparent to those of skill in the art upon reading this disclosure.

Once stored-value product 10 is assembled, then, in one embodiment, at 304, stored-value product 10 is coupled with backer 130. More specifically, stored-value product 10 is coupled to backer 130 with adhesive 136 or other fastener, material, etc. such that account identifier 40 is viewable through window 150 of backer 130 as generally illustrated with additional reference to FIG. 12B. In one instance, account identifier 40 is defined on non-inflatable portion 60 of stored-value product 10 such that non-inflatable portion 60 is at least partially viewable through window 150. In one embodiment, where stored-value product 10 is provided without a backer 130, operation 304 may be eliminated.

Figure 14:
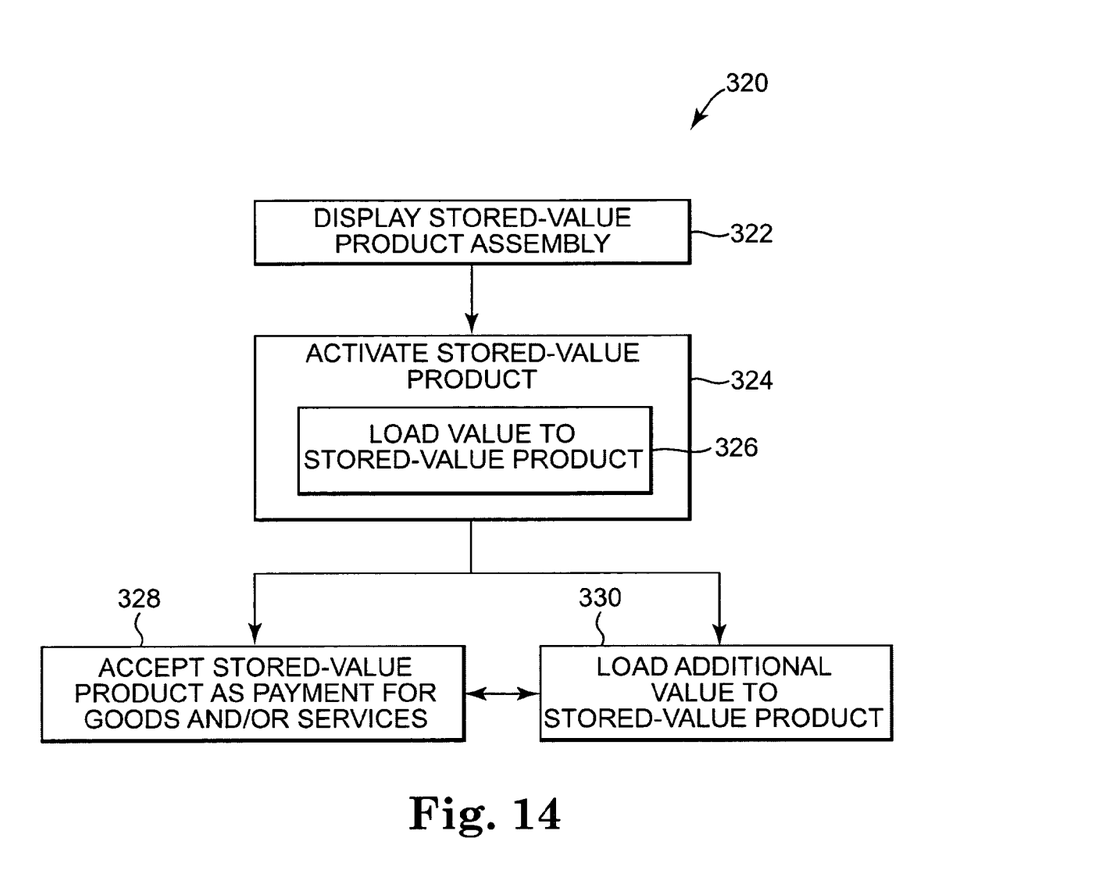
FIG. 14 is a flow chart illustrating a method of encouraging purchase and facilitating use of a stored-value product, according to one embodiment of the present invention.

FIG. 14 is a flow chart illustrating one embodiment of a method 320 of providing stored-value product 10 for sale and use by consumers. At 322, stored-value product 10 is placed or hung from a rack, shelf, or other similar device to display stored-value product 10 for sale to potential consumers. In one embodiment, a depiction of stored-value product 10 is placed on website for viewing and purchase by potential consumers. In one embodiment, stored-value product 10 is displayed without backer 130.

At 324, a consumer who has decided to purchase stored-value product 10 presents stored-value product assembly 138 (or just stored-value product 10 where no backer 130 is included) to a retail store employee, retail store kiosk, or other person or device to read account identifier 40 from stored-value product 10 and to access a financial account or financial record linked to account identifier 40. In particular, account identifier 40 is scanned or otherwise accessed/read, and in one example, is read through window 150 of backer 130. Upon accessing the financial account or financial record, at 326, value is added to the financial account or financial record. Thus, stored-value product 10 is activated and loaded. Once stored-value product 10 is activated and loaded, stored-value product 10 can be used by the consumer or any other bearer of stored-value product 10 to purchase goods and/or services at the retail store or other affiliated retail setting or website.

At 328, the retail store or other affiliated retail setting or website accepts stored-value product 10 as payment toward the purchase of goods and/or services made by the current bearer of stored-value product 10. In particular, the value currently loaded on stored-value product 10 is applied toward the purchase of goods and/or services. At 330, additional value is optionally loaded on stored-value product 10 at a point-of-sale terminal, kiosk, or other area of the retail store or related setting. Upon accepting stored-value product 10 as payment at 328, the retail store or related setting can subsequently perform either operation 328 or operation 330 as requested by a current bearer of stored-value product 10. Similarly, upon loading additional value on stored-value product 10 at 330, the retail store or related setting can subsequently perform either operation 330 again or operation 328. In one example, the ability to accept stored-value product 10 as payments for goods and/or services is limited by whether the financial account or financial record associated with stored-value product 10 has any value at the time of redemption.

Figure 15:
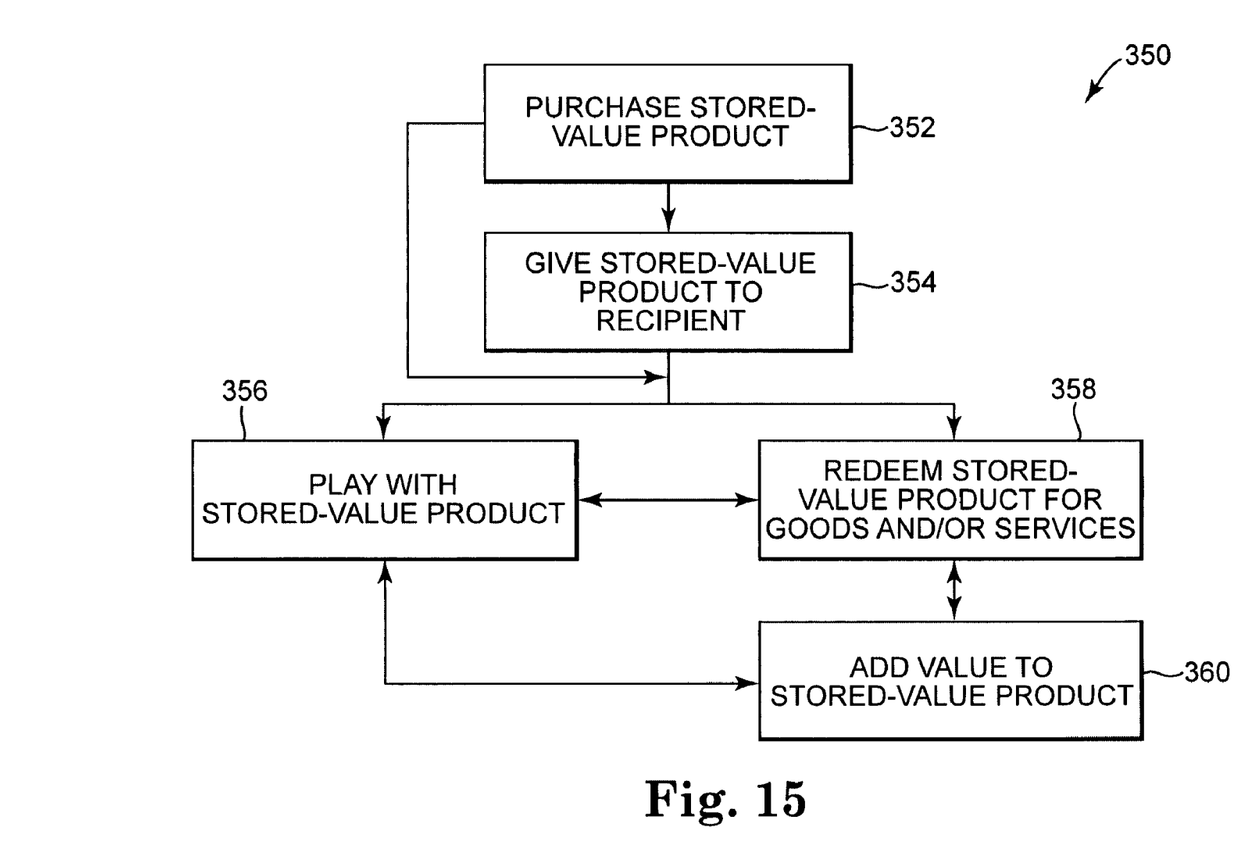
FIG. 15 is a flow chart illustrating a method of using a stored-value product, according to one embodiment of the present invention.

FIG. 15 is a flow chart illustrating one embodiment of a method 350 of using stored-value product 10. At 352, a potential consumer of stored-value product 10, which is displayed in a retail store or viewed on a website, decides to and does purchase stored-value product 10 from a retail store or website setting. Stored-value product 10 can be displayed and purchased alone or as part of a retail product along with backer 130. Upon purchasing a stored-value product 10, a retail store employee, a retail store kiosk, or other person or device scans or otherwise reads account identifier 40. In one embodiment, account identifier 40 is read through window 150 of backer 130. Upon reading account identifier 40, the financial account or record linked to account identifier 40 is accessed and activated to load value onto stored-value product 10.

At 354, the consumer optionally gives stored-value product 10 to a recipient, such as a graduate, relative, friend, expectant parents, one having a recent or impending birthday, a couple having a recent or impending anniversary, etc. In one embodiment, a plurality of stored-value products 10 are purchased and given to party goers, such as at a birthday party, New Year's Eve party, for Christmas, etc. as party favors or gifts. As an alternative, the consumer can keep stored-value product 10 for his or her own use.

At 356, the consumer or recipient, whoever is in current ownership or otherwise is the current bearer of stored-value product 10, removes stored-value product 10 from backer 130 if stored-value product 10 is coupled with backer 130. During or after this operation, the bearer of stored-value product 10 can optionally play with stored-value product 10 by selectively inflating and deflating stored-value product 10. For instance, stored-value product 10 is inflated when bearer repeatedly presses or squeezes stored-value product 10 at pump chamber 54 to repeatedly compress the interior pump 12 therein. Each time pump chamber 54 is released air enters pump chamber 54 through intake aperture 32 and fills voids 72 of pump material 70. Then, when bearer squeezes housing 27 near pump chamber 54 to compress pump material 70 the fluid such as air is forced out of voids 72 and through check valve 14 to bladder 56.

Generally, after repeated squeezes, bladder 56 is filled with air. Bladder 56 remains filled with air until a bearer of stored-value product 10 pushes on release valve 16 through exhaust aperture 34 (e.g., applies force generally indicated at 110) and opening 114 (FIGS. 8A and 8B) to open release valve 16. While release valve 16 is open, air escapes from bladder 56 through open end 106, through non-sealed chamber 108, and finally through exhaust aperture 34 to deflate bladder 56. Notably, in one embodiment, bladder 56 only continues to deflate so long as opening force 110 is maintained on release valve 16. Stored-value product 10 is configured to be repeatedly inflated and deflated as desired by the bearer of stored-value product 10.

At 358, the current bearer of stored-value product 10 redeems stored-value product 10 for goods and/or services from the retail store or website. At 360, the current bearer of stored-value product 10 optionally adds value to stored-value product 10, and more particularly, to the financial account or financial record associated with stored-value product 10, at the retail store or over the Internet. Upon playing with stored-value product 10 at 356, redeeming stored-value product 10 at 358, or adding value to stored-value product 10 at 360, the current bearer of stored-value product 10 subsequently can perform any of operations 356, 358, or 360 as desired. In one embodiment, the ability of the current bearer to repeat redeeming stored-value product 10 at 358 is limited by whether the financial account or financial record associated with stored-value product 10 has any remaining value at the time of attempted redemption.

Although described above as occurring at a single retail store or website, in one embodiment, purchasing stored-value product 10 at 352, redeeming stored-value product 10 at 358, and adding value to stored-value product 10 at 360, can each be performed at any one of a number of stores adapted to accept stored-value product 10 or over the Internet. In one example, a number of stores are each part of a chain or similarly branded stores. In one example, a number of stores includes at least one website and/or at least one conventional brick and mortar store.

Stored-value products come in many forms, according to embodiments of the invention. The gift card product, like other stored-value products, can be "re-charged" or "re-loaded" at the direction of the original consumer, the gift recipient, or third party. The term "loading on" or "loaded on" herein should be interpreted to include adding to the balance of a financial account or financial record associated with a stored-value product. The balance associated with the stored-value product declines as the product, and value associated therewith, is used, encouraging repeat visits. The product remains in the user's purse or wallet, serving as an advertisement or a reminder to revisit the associated merchant. Gift card products according to embodiments of the invention provide a number of advantages to both the consumer and the merchant. Other gift card products and stored-value products according to embodiments of the invention include loyalty card products, merchandise return products, electronic gift certificates, employee products, frequency products, prepaid products, and other types of products associated with or representing purchasing power or monetary value, for example.

Although the invention has been described with respect to particular embodiments, such embodiments are meant for illustrative purposes only and should not be considered to limit the invention. Various alternatives, changes, an modifications within the scope of the invention will be apparent to those of ordinary skill in the art upon reading this disclosure.

What is claimed is:

1. A stored-value item comprising:
   means for dividing the stored-value item such that the stored-value item includes:
      means for maintaining a pressurized fluid, and
      a substantially flat portion of the stored-value item that is substantially non-inflatable,
      wherein the means for maintaining the pressurized fluid and the substantially flat portion are defined directly adjacent to and on opposite sides of the means for dividing, and the means for dividing substantially prevents the pressurized fluid from entering the substantially flat portion from the means for maintaining the pressurized fluid, and the substantially flat portion is sealed around an entire outer perimeter thereof;
   means for forcing the pressurized fluid into the means for maintaining, the means for forcing the pressurized fluid being separate from the substantially flat portion;
   means for releasing the pressurized fluid from the means for maintaining; and
   means for associating the means for maintaining with a financial account or a financial record, wherein the means for associating is fixedly secured to and is adapted to be mechanically read from the substantially flat portion of the stored-value item.

2. The stored-value item of claim 1, further comprising means for enclosing the means for forcing the pressurized fluid into the means for maintaining, the stored-value item further comprising means for permitting one-way fluid flow from the means for enclosing to the means for maintaining.

3. The stored-value item of claim 1, further comprising means for enclosing the means for forcing the pressurized fluid into the means for maintaining, the means for enclosing being separate from the means for maintaining, wherein the means for releasing fluid is positioned in the means for maintaining, and the means for enclosing is different than the substantially flat portion.

4. The stored-value item of claim 1, wherein the fluid is air.

5. A method of encouraging purchase and facilitating use of a financial transaction card, the method comprising:

displaying a financial transaction product including a housing defining a readily deformable chamber, the deformable chamber being configured to transition from a collapsed state into an expanded state when air is introduced therein, wherein the financial transaction product includes an account identifier linked to a financial account or a financial record; and activating the financial transaction product including using the account identifier to access the financial account or the financial record, wherein activating the financial transaction product readies the financial transaction product for subsequent use as at least partial payment for one or more of goods and services;

wherein activating the financial transaction product includes scanning the account identifier, and the method further comprises transitioning the deformable chamber to the collapsed state prior to scanning the account identifier.

6. The method of claim 5, wherein displaying the financial transaction product permits potential consumers to initiate transition of the deformable chamber between the collapsed state and the expanded state.

7. The method of claim 5, wherein:

displaying the financial transaction product includes providing the financial transaction product to include a non-inflatable portion extending away from the deformable chamber and being configured to maintain a substantially planar configuration during transitioning of the deformable chamber from the collapsed state into the expanded state, the account identifier is fixedly applied to and fully supported by the non-inflatable portion, and the non-inflatable portion is of sufficient size to allow machine reading of the account identifier from the non-inflatable portion during activating the financial transaction product.

* * * * *